Oct. 18, 1932.    E. H. J. C. GILLETT    1,882,807
TRANSMISSION SYSTEM
Filed Dec. 6, 1929    4 Sheets-Sheet 1

Fig.1

Inventor
E. H. J. C. Gillett
by Wilkinson & Giusta
Attorneys.

Oct. 18, 1932.  E. H. J. C. GILLETT  1,882,807
TRANSMISSION SYSTEM
Filed Dec. 6, 1929  4 Sheets-Sheet 2

Inventor
E. H. J. C. Gillett
by Wilkinson & Giusta
Attorneys.

Oct. 18, 1932.  E. H. J. C. GILLETT  1,882,807
TRANSMISSION SYSTEM
Filed Dec. 6, 1929    4 Sheets-Sheet 3
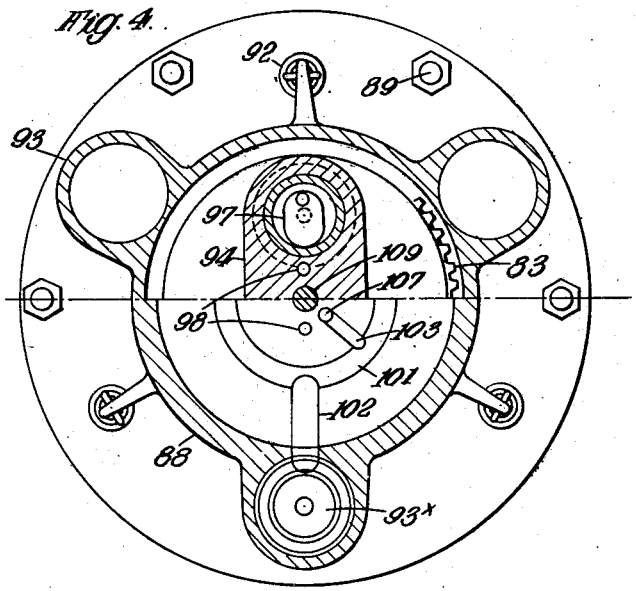
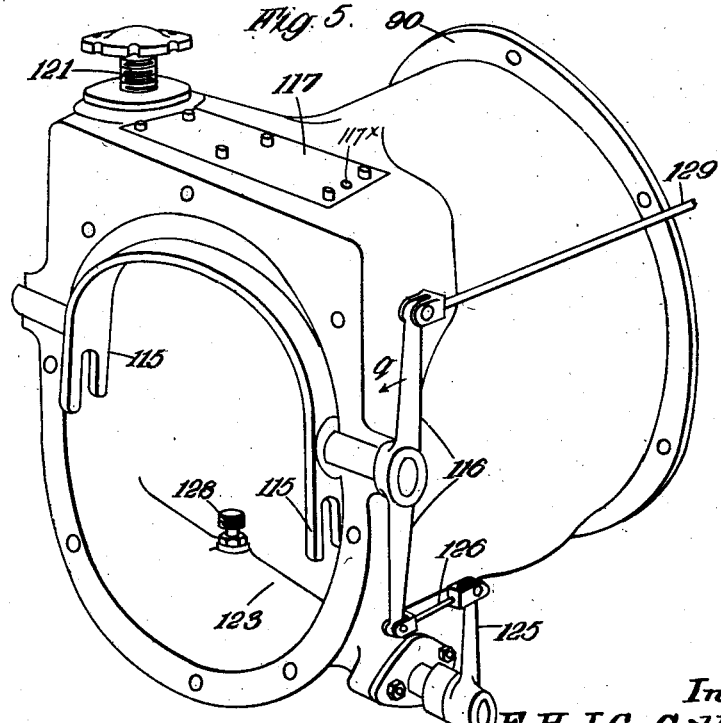
Inventor
E. H. J. C. Gillett
by Wilkinson & Hiusta
Attorneys.

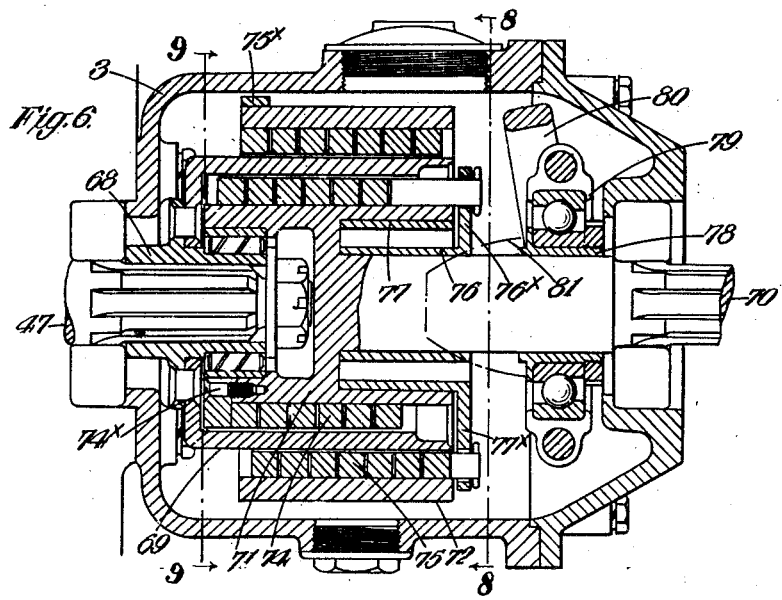
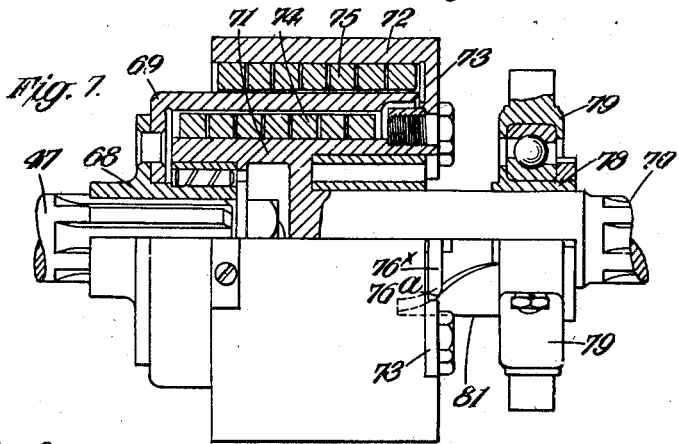
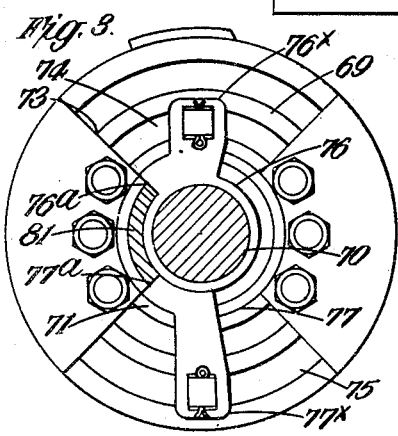
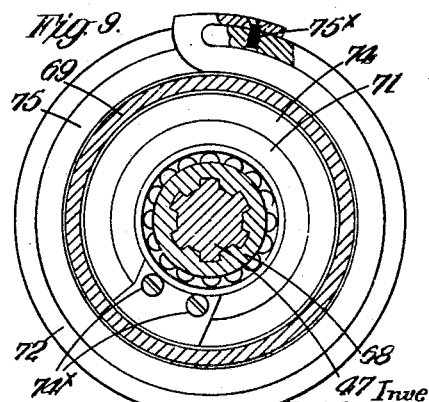

Patented Oct. 18, 1932

1,882,807

UNITED STATES PATENT OFFICE

EDWARD HENRY JAMES CECIL GILLETT, OF WEST HAMPSTEAD, LONDON, ENGLAND

TRANSMISSION SYSTEM

Application filed December 6, 1929, Serial No. 412,126, and in Great Britain June 10, 1929.

This invention relates to transmission and control systems for motor road vehicles.

An object of this invention is the provision of a mechanical power transmission system comprising variable speed gearing and in which said variable speed gearing may be completely isolated both from the prime mover and from the driven mechanism.

Another object of the present invention is to facilitate the operation of "changing gear" in a power transmission system of the type referred to.

A further object of the present invention is the provision of means whereby the isolation of the said variable speed gearing may be carried out in conjunction with the speed control of the prime mover in such a manner that when the speed of the prime mover is reduced to a pre-determined minimum or idling speed, the variable speed gearing will be automatically isolated, and so that on increasing the speed of the prime mover, connection is again established between the prime mover and the variable speed gearing and between the variable speed gearing and the driven mechanism, and the drive taken up in a smooth and progressive manner.

A feature of the present invention is the provision of two clutches disposed respectively between the prime mover and the variable speed gearing and between the variable speed gearing and the driven road wheels.

A further feature of the present invention is the provision of a servo-device controlled by the prime mover speed control device (hereinafter referred to as the "accelerator") for effecting the engagement and disengagement of one or both of the said clutches.

In order that the nature of the present invention and the manner in which it is to be carried out may be more fully and easily understood, a power transmission system for a motor vehicle is illustrated in and described with reference to the accompanying drawings, of which:—

Fig. 1 is a schematic view showing the general arrangement of a motor vehicle transmission system.

Figure 2:
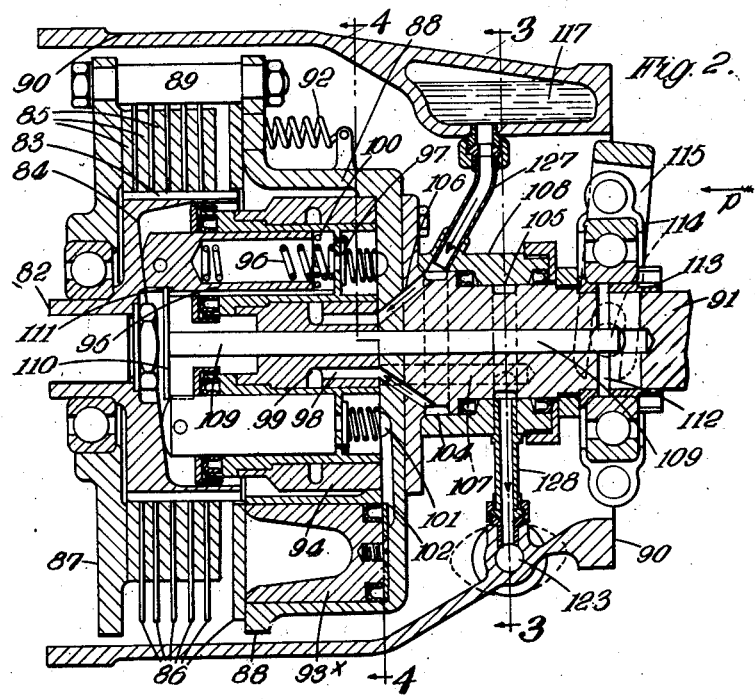
Figure 3:
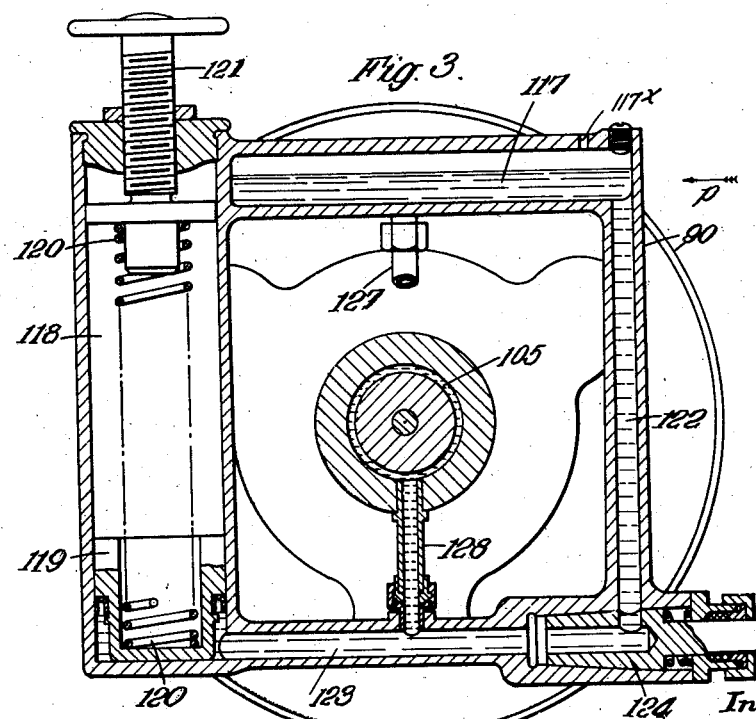

Figs. 2, 3, 4 and 5 refer to a transmission interrupting device indicated by the reference numbers 90, 116, 125, 126, and 129 in Fig. 1 and comprising friction clutch elements and a servo-device for effecting engagement and disengagement of said friction clutch elements, Fig. 2 being a longitudinal vertical section, Figs. 3 and 4 being sections viewed in the direction of the arrows along the lines 3—3 and 4—4 respectively in Fig. 2, the casing being removed in Fig. 4, and Fig. 5 being a view in perspective in the direction of the arrows $p$ in Figs. 2 and 3.

Figs. 6, 7, 8 and 9 refer to a transmission interrupting device indicated by the reference number 3 in Fig. 1 and comprising a duplicate clutch of self-wrapping coil type controlled directly by the accelerator.

Fig. 6 being a central longitudinal vertical section,

Fig. 7 a plan view from above, half centrally sectioned and with the casing removed, and Figs. 8 and 9 transverse sections viewed in the direction of the arrows respectively along the lines 8—8 and 9—9 in Fig. 6.

Referring to Fig. 1:—

1 is the engine or prime mover, 2 a casing containing variable speed gearing controlled by a lever 8 in the known manner, 4 is a torque tube containing a driven shaft 47 (see Figs. 6, 7, 8 and 9), 5 is an accelerator lever terminating in a pedal 12 and controlling an engine throttle 7 by means of a rod 6; 90 is a casing containing a transmission interrupting device illustrated in Figs. 2, 3, 4 and 5, and controlled by a lever 116, a rod 126, and a lever 125, the lever 116 being operatively connected to the accelerator 5 by means of a rod 129; and 3 is a casing containing a transmission interrupting device of a duplicate coil clutch type illustrated in Figs. 6, 7, 8 and 9 and controlled by a rocking shaft 11 to which is keyed a lever 10, which is in turn operatively connected by means of a rod 9 to the accelerator 5.

Referring to Figs. 2, 3, 4, and 5:—

A clutch is provided comprising a casing 90, a driving member 82 externally splined at 83 and having an internal inclined disc or swash plate 84, driving plates 85 slidably mounted on the splines 83 and engaging with driven plates 86, driven members 87, 88 secured together by the bolts 89 on which are slidably mounted the plates 86, and a driven shaft 91 rigidly fixed to the member 88.

Clutch withdrawal springs 92 are fixed to the end member of the series of plates 86 and to the member 88, which latter also comprises hydraulic cylinders 93 and rams $93^x$ adapted to engage the clutch by pressure on the end plate of the series 86, a pump body 94, plungers 95 held in contact with the swash plate 84, springs 96, and spring-loaded non-return valves 97.

In the pump body 94 are formed passages 98 and annular grooves 99 communicating by holes 100 with the underside of the plungers 95, and in the member 88 are formed an annular groove 101, radial grooves 102 giving communication between the non-return valves 97 and the cylinders 93, and a short radial groove 103 communicating with the groove 101 (see more particularly Fig. 4). The shaft 91 has formed on its surface annular grooves 104, 105 and passages 106, 107 are drilled through the member 88 and the shaft 91 by which communication is effected respectively between the passages 98 and the groove 104 and between the groove 103 and the groove 105. An oil-tight sleeve 108 surrounds the shaft 91. There is further provided an axially slidable central rod 109 having at one end a disc 110 engaging the plungers 95 by means of shoulders 111, and having at its other end a pin 112 slidably disposed in a slot in the shaft 91 and engaging a slidable sleeve 113 carrying a bearing and trunnion block 114 adapted to be engaged by a forked stirrup 115 rockably mounted in the casing 90 and carrying an external lever 116 (see more particularly Fig. 5).

In the casing 90 are formed an oil reservoir 117 having in its cover a small aperture $117^x$ communicating with the atmosphere, a variable oil accumulator comprising a cylinder 118, a slidable piston 119, a spring 120, and a screw adjustment 121 (see more particularly Figs. 3 and 5), and passages 122, 123 whereby the reservoir 117 and the variable oil accumulator respectively communicate with a control valve 124 controlled by a lever 125 which is connected with the lever 116 by a rod 126 (see Fig. 5). Pipes 127, 128 respectively connect the reservoir 117 with the groove 104 and the passage 123 with the groove 105. Referring to Fig. 5, a rod 29 connects the lever 116 with the engine accelerator lever 5 (see Fig. 1).

Referring to Figs. 6, 7, 8 and 9:—

Within a casing 3, to a shaft 47 transmitting the drive from the variable gearing, is splined a sleeve 68 having riveted thereto a drum 69. 70 is a driven shaft having integrally formed therewith a drum 71 and having bolted thereto by means of the flanged sectors 73 a drum 72. Coil springs 74, 75 attached each by one end at $74^x$, $75^x$ to the drums 71, 72 respectively lie within and surround the drum 69, forming with it a double coil clutch, the springs being so wound that the clutch can transmit rotation in either sense. The other ends of the coil springs 74, 75 are attached respectively to the sleeves 76, 77 by means of the arms $76^x$, $77^x$. Slidably mounted on the shaft 70 is a sleeve 78 carrying a trunnion block and bearing 79 engaging with a fork 80, which is rigidly fixed to the shaft 11 (see Fig. 1). On the sleeve 78 is formed a cam-shaped tongue 81 engaging with faces $76^a$, $77^a$, of the arms $76^x$, $77^x$.

The operation of this device is as follows:—

For the sake of clearness the method of operation of the two transmission interrupting devices illustrated respectively in Figs. 2, 3, 4 and 5 and in Figs. 6, 7, 8 and 9 will be described separately, although they are simultaneously operated by the movements of the accelerator 5.

Referring to Figs. 1, 2, 3, 4, and 5, depression of the accelerator 5, 12 (Fig. 1) actuates the rod 129 to move the lever 116 in the direction of the arrow $q$ in Fig. 5. The movement of the lever 116 in this direction acts by means of the train of elements 115, 114, 113, 112, 110 and 111 to allow the plungers 95, which are normally held out of engagement with the swash plate 84 by the disc 110, to be brought into contact with the swash plate by means of the springs 96. At the same time the movement of the lever 116 acting by means of the rod 126 and the lever 125 turns the control valve 124 so as to close the communication between the passages 122 and 123.

The rotation of the driving member 82 acting by means of the swash plate 94 on the plungers 95 causes them to reciprocate and draw oil from the reservoir 117 by means of the passages 127, 106, 104, 98, 99 and 100 and deliver it by means of the non-return valves 97 and the grooves 101 to the grooves 102 and thence to the cylinders 93, and also to the groove 103 and thence by means of the passages 107, 105, 128 and 123 to the variable oil accumulator cylinder 118, forcing the piston 119 up against the compression of the spring 120. The pressure of the oil in the cylinders 93 is thus controlled by the compression of the spring 120, which may be regulated by the screw adjustment 121.

The oil pressure in the cylinders 93 drives forward the rams $93^x$ which press the clutch plates 86, 85 into engagement against the tension of the springs 92 and thus rotation is transmitted from the driving member 82 to the driven members 87, 88 and 91. As long as there is any relative rotation between the members 82 and 88 the pumping action of the plungers 95 continues and is the more vigorous the greater is the rate of relative rotation. When the clutch members are completely engaged the compression of the spring 120 maintains the oil pressure in the cylinders 93 and thus keeps the clutch members in engagement.

Referring again to Fig. 1, further depression of the accelerator pedal 12 acting by means of the lever 5 and the rod 6 opens the throttle 7 and increases the speed of the engine. Release of the accelerator pedal first closes the throttle 7, thus reducing the speed of the engine to a pre-determined minimum or idling speed. Further movement acting by means of the rod 129 and the lever 116 and the internal train of elements 115, 114, 113, 112, 110 and 111, withdraws the plungers 95 from contact with the swash plate 84 and by means of the rod 126 and the lever 125, turns the control valve 124 to open communication between the passages 122 and 123.

The pressure in the oil system is now released and the piston 119 of the oil accumulator is returned by the spring 120 driving the accumulated oil back by the passages 122, 123 to the reservoir 117, which is constantly at atmospheric pressure and whither the oil in the cylinders 93 is also returned by means of the passages 102, 101, 103, 107, 105, 128, 123 and 122, the rams 93ˣ being returned by the springs 92, which at the same time disengage the clutch members 85, 86, thus allowing the driving member 82 to run free of the driven members 87, 88 and 91.

The operation of the second transmission interrupting device illustrated in Figs. 6, 7, 8 and 9 is as follows:—

When the accelerator pedal 12 is depressed the accelerator 5, acting by means of the rod 9, the lever 10, and the rocking shaft 11 (see Fig. 1) causes the cam-shaped tongue 81 to be moved inwards (i. e. towards the shaft 47), thus separating the faces 76ᵃ, 77ᵃ and giving a partial rotation in opposite directions to the arms 76ˣ 77ˣ and the sleeves 76, 77. Owing to the direction in which the springs are respectively wound, this partial rotation of their ends attached to the arms 76ˣ, 77ˣ causes them to grip the drum 69 on its inner and outer faces, and thus the drive is transmitted from the shaft 70 through one or other of the coil springs 74, 75 to the drums 69 and thence to the driven shaft 47. Release of the accelerator pedal 12 causes a return movement of the cam-shaped tongue 81, thus releasing both coil springs from the drum 69 and interrupting the drive.

Referring again to Fig. 1, it will be seen that when the accelerator pedal 12 is completely released, the transmission is interrupted by both the transmission interrupting devices contained in the casings 90 and 3, thus completely isolating the variable speed gearing 2 both from the prime mover 1 and from the driven shaft 47.

What I claim is:—

1. In an automobile, a driving motor and a control and transmission system comprising in combination an accelerator for regulating the speed of the driving motor, a servo-operated main clutch including progressively engaging means, an additional clutch including quick engaging means, a variable speed gear interposed between the clutches, and control means for both clutches operatively connected to the accelerator whereby movement of the accelerator to accelerate the motor engages both clutches and maintains the clutches in engagement over the greater part of the accelerator range of movement, and movement of the accelerator to decelerate the motor disengages both clutches.

2. In an automobile, a driving motor and a control and transmisison system comprising in combination an accelerator for regulating the speed of the driving motor, a main clutch including progressively engaging means, an additional clutch including quick engaging means, a variable speed gear interposed between the clutches, main clutch-disengaging means, main clutch-engaging servo-means energized by the motor and control means for the servo-means and for the additional clutch operatively connected to the accelerator whereby movement of the accelerator to accelerate the motor engages the auxiliary clutch and renders the servo-means operative to engage the main clutch and movement of the accelerator for decelerating the motor disengages the auxiliary clutch and renders the servo-means inoperative, so as to permit the disengaging means to disengage the main clutch, both clutches being maintained in engagement over the greater part of the accelerator range of movement.

3. In an automobile, a driving motor and a control and transmission system comprising in combination an accelerator for regulating the speed of the driving motor, two clutches, a variable speed gear interposed between said clutches, clutch-disengaging means, a clutch-engaging servo-device energized by the motor and operating on both clutches simultaneously and a control connection between the accelerator and the servo-device so arranged that the servo-device is rendered operative to engage the clutches when the accelerator is moved to accelerate the motor and continues operative over the great part of the accelerator range of movement but is rendered inoperative so as to permit automatic disengagement of the clutches when the accelerator is moved fully back to decelerate the motor.

4. In an automobile, a driving motor and a control and transmission system comprising in combination an accelerator for regulating the speed of the motor, two clutches, at least one of which embodies frictionally engaging members and spring means normally holding said frictional members disengaged, a variable speed gear interposed between said clutches, means for automatically disengaging both clutches to isolate the variable speed gear when the accelerator is moved fully back to decelerate the motor and for engaging said clutches on speeding up the motor, said means including a servo-device energized by the motor to progressively effect and maintain engagement of the frictional members, and a connection between the accelerator and said servo-device, whereby the first movement of the accelerator to accelerate the motor brings the servo-device into action, further movement of the accelerator serving only to accelerate the motor, so that the speed of the motor may be regulated with the clutches engaged.

5. In an automobile, a driving motor and a control and transmission system comprising in combination an accelerator for regulating the speed of the motor, two clutches, at least one of which embodies frictionally engaging members and spring means normally holding said frictional members disengaged, a variable speed gear interposed between said clutches and means for automatically disengaging both clutches to isolate the variable speed gear when the accelerator is moved fully back to decelerate the motor and for engaging said clutches on speeding up the motor, said means including a servo-device energized by the motor and adapted to engage said frictional members at a rate proportionate to the difference of their rotational speeds and to maintain said frictional members in engagement, and a connection between the accelerator and said servo-device, whereby the first movement of the accelerator to accelerate the motor brings the servo-device into action, further movement of the accelerator serving only to accelerate the motor, so that the speed of the motor may be regulated with the clutches engaged.

6. In an automobile, a driving motor and a control and transmission system comprising in combination an accelerator for regulating the speed of the motor, two clutches, at least one of which embodies frictionally engaging members and spring means normally holding said frictional members disengaged, a variable speed gear interposed between said clutches and means for automatically disengaging both clutches to isolate the variable speed gear when the accelerator is moved fully back to decelerate the motor and for engaging said devices on speeding up the motor, said means including a servo-device comprising a hydraulic plunger pump deriving power from the motor, a hydraulic ram actuated by said pump and operative to engage and maintain in engagement the frictional members and a bypass valve rendering the ram inoperative when the valve is open and so controlled by the accelerator that the first movement of the accelerator to accelerate the motor closes the bypass valve to render the ram operative, further movement of the accelerator serving only to accelerate the motor, so that the speed of the motor may be regulated with the clutches engaged.

7. In an automobile, a driving motor and a control and transmission system comprising in combination an accelerator for regulating the speed of the motor, two clutches, at least one of which embodies frictionally engaging members and spring means normally holding said frictional members disengaged, a variable speed gear interposed between said clutches and means for automatically disengaging both clutches to isolate the variable speed gear when the accelerator is moved fully back to decelerate the motor and for engaging said devices on speeding up the motor, said means including a servo-device comprising hydraulic plunger pumps energized by the motor, hydraulic rams actuated by said pumps and operative to engage and maintain in engagement the frictional members, an adjustably spring loaded fluid accumulator interposed between said pumps and said rams for regulating the engaging pressure of the frictional members, a fluid reservoir open to the atmosphere and feeding the pumps by gravity, a bypass from the rams to the reservoir and a bypass valve rendering the rams inoperative when the valve is open and so controlled by the accelerator that the first movement of the accelerator to accelerate the motor closes the bypass valve to render the rams operative, further movement of the accelerator serving only to accelerate the motor, so that the speed of the motor may be regulated with the clutches engaged.

8. In an automobile, a driving motor and a control and transmission system comprising in combination an accelerator for regulating the speed of the motor, two clutches, at least one of which embodies driving and driven clutch members with frictional engaging means and spring means normally holding said clutch members disengaged, a variable speed gear interposed between said clutches and means for automatically disengaging both clutches to isolate the variable speed gear when the accelerator is moved fully back to decelerate the motor and for engaging said clutches on speeding up the motor, said means including hydraulic plunger pumps and clutch-engaging rams incorporated in one of the said friction clutch members, and a hydraulic connection between said pumps and said rams, means incorporated in the other friction clutch member for actuating the pumps at a rate proportionate to the difference of the rotational speeds of the driving and driven friction clutch members and a bypass valve rendering the rams inoperative when the valve is open and controlled by the accelerator in such a manner that the first movement of the accelerator to accelerate the motor closes the bypass to render the rams operative, further movement of the accelerator serving only to accelerate the motor, so that the speed of the motor may be regulated with the clutches engaged.

9. The combination as claimed in claim 8 and including means operatively connected with the bypass valve for disengaging the pumps from the pump actuating means when the bypass valve is open.

10. In an automobile, a driving motor and a control and transmission system comprising in combination an accelerator for regulating the speed of the motor, two clutches, at least one of which embodies driving and driven friction-clutch members and spring means normally holding said clutch members disengaged, a variable speed gear interposed between said clutches and means for automatically disengaging both clutches to isolate the variable speed gear when the accelerator is moved fully back to decelerate the motor and for engaging said clutches on speeding up the motor, said means including hydraulic plunger pumps and clutch-engaging rams incorporated in one of the friction-clutch members and a hydraulic connection between said pumps and said rams, inclined swash-plate means incorporated in the other friction clutch member for actuating the pumps at a rate proportionate to the difference of the rotational speeds of the driving and driven friction-clutch members and a bypass valve rendering the rams inoperative when the valve is open and controlled by the accelerator in such a manner that the first movement of the accelerator to accelerate the motor the bypass to render the rams operative, further movement of the accelerator serving only to accelerate the motor so that the speed of the motor may be regulated with the clutches engaged.

11. In an automobile, a driving motor and a control and transmission system comprising in combination an accelerator for regulating the speed of the motor, two friction clutches, means normally holding the clutches out of engagement and hydraulic rams for engaging the said clutches, a variable speed gear interposed between said clutches, at least one hydraulic plunger pump and pump-actuating means energized by the motor, hydraulic circuits connecting the pump with the rams of both clutches, and a bypass valve controlled by the accelerator in such a manner that the first movement of the accelerator to accelerate the motor closes the bypass valve to render the rams operative, further movement of the accelerator serving only to accelerate the motor so that the speed of the motor may be regulated with the clutches engaged, whereas on moving the accelerator fully back to decelerate the motor, the bypass valve is opened to render the rams inoperative and allow the clutches to be automatically disengaged by the disengaging means.

12. In an automobile, a driving motor and a control and transmission system comprising in combination an accelerator for regulating the speed of the motor, a progressively engageable main clutch, means normally holding said main clutch disengaged, a servo-device energized by the motor for effecting and maintaining engagement of said main clutch, an additional quick-acting clutch including a drum, a helical coil spring coacting therewith and controlling means therefor, a variable speed gear interposed between the main and additional clutches and means connecting the accelerator with the servo-device and with the additional clutch controlling means, in such a manner that on first moving the accelerator to accelerate the motor the additional clutch is engaged and the servo-device brought into action to engage the main clutch, further movement of the accelerator serving only to accelerate the motor, so that the speed of the motor may be regulated with the clutches engaged, while both clutches are automatically disengaged to isolate the variable speed gear moving the accelerator fully back to decelerate the motor.

13. In an automobile, a driving motor and a control and transmission system comprising in combination an accelerator for regulating the speed of the motor, a progressively engageable main clutch, means normally holding said main clutch disengaged, a servo-device energized by the motor for effecting and maintaining engagement of said main clutch, an additional quick-acting clutch including a drum, a pair of oppositely wound helical coil springs coacting therewith to transmit motion in the forward and reverse directions respectively and controlling means therefor, a variable speed gear interposed between the main and additional clutches and means connecting the accelerator with the servo-device and with the additional clutch controlling means, in such a manner that on first moving the accelerator to accelerate the motor the additional clutch is engaged and the servo-device brought into action to engage the main clutch, further movement of the accelerator serving only to accelerate the motor, so that the speed of the motor may be regulated with the clutches engaged, while both clutches are automatically disengaged to isolate the variable speed gear on moving the accelerator fully back to decelerate the motor.

14. In an automobile, a driving motor and a control and transmission system comprising in combination an accelerator for regulating the speed of the motor, a progressively engageable main clutch, means normally holding said main clutch disengaged, a servo-device including a hydraulic plunger pump energized by the motor, a hydraulic ram actuated by said pump for effecting and maintaining engagement of said main clutch, a bypass valve rendering the ram inoperative when opened, an additional quick-acting clutch including a drum, a helical coil spring coacting therewith and controlling means therefor, a variable speed gear interposed between the main and additional clutches and means connecting the accelerator with the bypass valve and with the additional clutch controlling means in such a manner that on first moving the accelerator to accelerate the motor the auxiliary clutch is engaged and the bypass valve closed to render the ram operative to engage the main clutch, further movement of the accelerator serving only to accelerate the motor, so that the speed of the motor may be regulated with the clutches engaged, while on moving the accelerator fully back to decelerate the motor the additional clutch is disengaged and the bypass valve opened to render the ram inoperative and allow the main clutch to be disengaged by the disengaging means, so that the variable speed gear is isolated.

15. In an automobile, a motor, driven road wheels, a variable speed gear, a progressively-engaging clutch arranged between the motor and the variable speed gear, a quick-disengaging clutch arranged between the variable speed gear and the driven road wheels, power means actuating the progressively-engaging clutch, and control means for said power means connected to the quick-disengaging clutch to cause engagement and disengagement of the quick-disengaging clutch substantially with the engagement and disengagement of the progressively-engaging clutch to thereby isolate the variable speed gear when both clutches are disengaged to enable quiet gear changing.

16. In an automobile, a motor, an accelerator, driven road wheels, a variable speed gear, a progressively-engaging clutch arranged between the motor and the variable speed gear, a quick-disengaging clutch arranged between the variable speed gear and the driven road wheels, power means actuating the progressively-engaging clutch, and connecting means between the accelerator, the power means and the quick-disengaging clutch to cause engagement of both clutches on moving the accelerator to accelerate the motor and disengagement of both clutches on moving the accelerator to decelerate the motor.

17. In an automobile, a motor, driven road wheels, a variable speed gear, a progressively-engaging clutch biased to disengaged position and arranged between the motor and the variable speed gear, a quick-disengaging clutch arranged between the variable speed gear and the driven road wheels, power means operating to engage the progressively-engaging clutch, and control means for said power means connected to the quick-disengaging clutch to cause engagement and disengagement of the quick-disengaging clutch substantially with the engagement and disengagement of the progressively-engaging clutch to thereby isolate the variable speed gear when both clutches are disengaged to enable quick gear changing.

18. In an automobile, a motor, an accelerator, driven road wheels, a variable speed gear, a progressively-engaging clutch biased to disengaged position and arranged between the motor and the variable speed gear, a quick-disengaging clutch arranged between the variable speed gear and the driven road wheels, power means operating to engage the progressively-engaging clutch, and connecting means between the accelerator, the power means and the quick-disengaging clutch to cause engagement of both clutches on moving the accelerator to accelerate the motor and disengagement of both clutches on moving the accelerator to decelerate the motor.

EDWARD HENRY JAMES CECIL GILLETT.